United States Patent [19]

Nakaya

[11] Patent Number: 5,463,664
[45] Date of Patent: Oct. 31, 1995

[54] DQPSK DELAY DETECTION CIRCUIT THAT PRODUCES STABLE CLOCK SIGNAL IN RESPONSE TO BOTH I AND Q SIGNALS

[75] Inventor: Kazuyoshi Nakaya, Kanagawa, Japan

[73] Assignee: Murata Mfg. Co., Ltd., Kyoto, Japan

[21] Appl. No.: 156,336

[22] Filed: Nov. 23, 1993

[30] Foreign Application Priority Data

Dec. 7, 1992 [JP] Japan ..................... 4-325879

[51] Int. Cl.$^6$ .............................. H04L 7/02; H03D 3/22
[52] U.S. Cl. ............................................ 375/360; 375/331
[58] Field of Search ................................ 375/84, 85, 86, 375/83, 86, 106, 118, 119, 80, 360, 331, 359, 361; 307/269; 328/133, 155

[56] References Cited

U.S. PATENT DOCUMENTS

| 4,879,728 | 11/1989 | Tarallo ........................................ 375/84 |
| 4,896,336 | 1/1990 | Henely et al. ............................ 375/84 |

OTHER PUBLICATIONS

Configuration and Characteristics of π/4–Shift QPSK Bandbase Delay Detector, Satoshi Denno et al., Autumn National Convention, B–300, 1990, Institute of Electronics, Information and Communication Engineers.

*Primary Examiner*—Stephen Chin
*Assistant Examiner*—Hai H. Phan
*Attorney, Agent, or Firm*—Jordan and Hamburg

[57] ABSTRACT

A DQPSK delay detection circuit is provided that can securely reproduce stable clock signal. An absolute value circuit ABS(14) calculates an absolute value of I signal. An absolute value circuit ABS(15) calculates an absolute value of Q signal. Subtraction circuit(16) generates a P signal according to the difference between the absolute values of I signal and Q signal. Zero-cross detection circuit(11) detects zero-cross timing of the P signal to input it as a timing signal to the DPLL(64). The zero-cross timing of the P signal can be detected even when the data pattern of I or Q signal makes it impossible to detect the zero-cross timing from I and Q signal. Because the zero-cross timing of the P signal has a variation less than that of the zero-cross timing determined from I or Q signal, it is becomes possible to reproduce stable clock signals and in turn reliability of data demodulation can be improved.

12 Claims, 9 Drawing Sheets

DQPSK DELAY DETECTION CIRCUIT THAT PRODUCES STABLE CLOCK SIGNAL IN RESPONSE TO BOTH I AND Q SIGNALS

BACKGROUND OF THE INVENTION

1. Field of the Invention

The present invention relates to a DQPSK (differential quadrilateral phase shift keying) delay detection circuit, and in particular to a DQPSK delay detection circuit that can produce stable regenerative clocks and also minimize the jitter of regenerative clocks.

2. Description of the Prior Art

Figure 6:
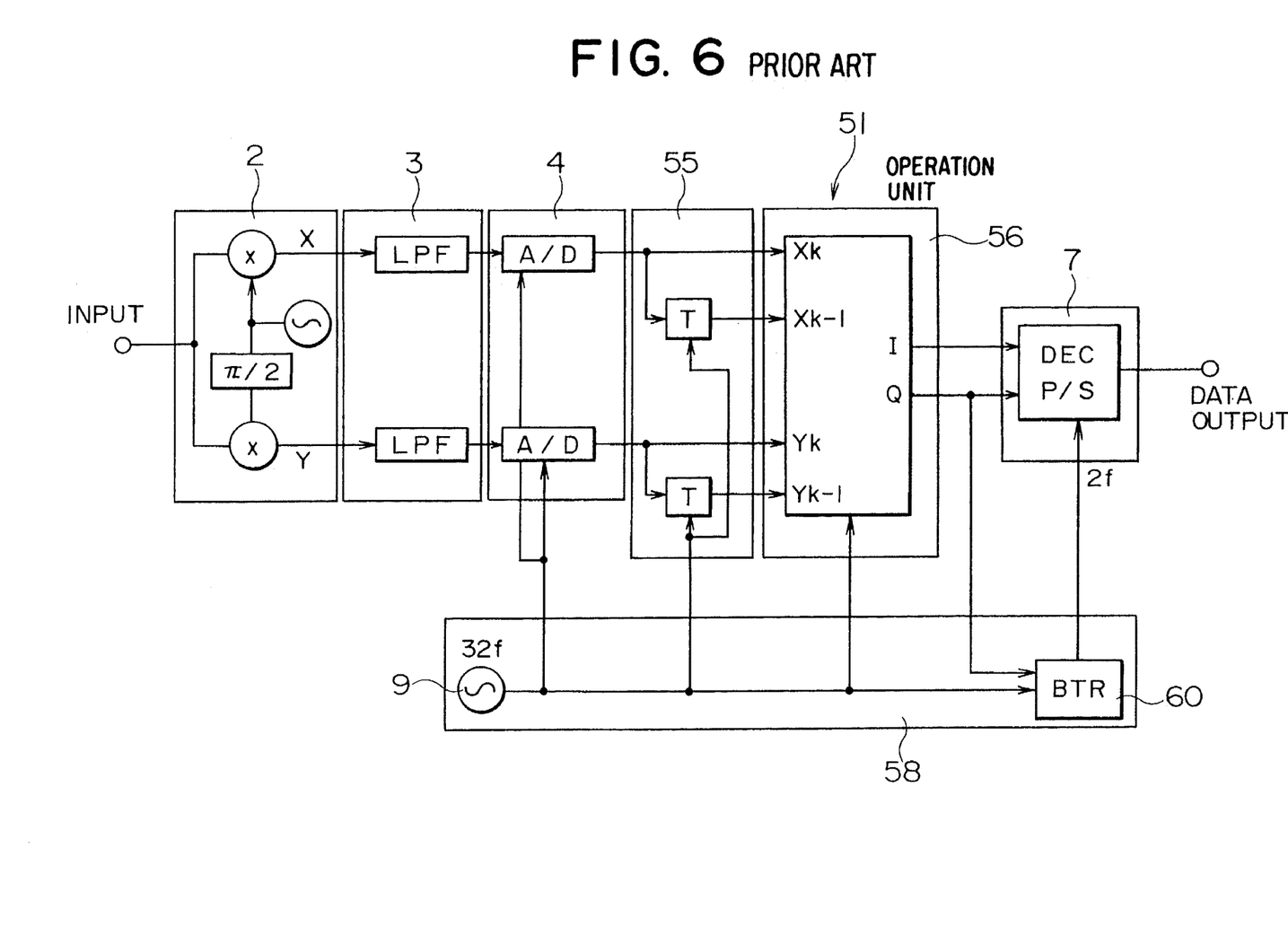
FIG. 6 is a block diagram showing an embodiment of P conventional DQPSK delay detection circuit.

FIG. 6 is a block diagram showing the configuration of a DQPSK delay detection circuit, reported in "Configuration and Characteristics of π/4 Shift QPSK Baseband Delay Detector", in Autumn national convention, B-300, 1990 Institute of Electronics, Information and Communication Engineers.

The above mentioned DQPSK delay detection circuit, hereafter referred to as DQPSK delay detection circuit(51), is comprised of a semi-synchronous detector(2), a low-pass filter(3), an A/D converter(4), a data delay unit(55), an operation unit(56), a judging unit(7), and a clock pulse generator(58).

The data delay unit(55) has a shift register T. The clock pulse generator(58) is provided with a clock signal generator circuit(9) and a BTR (bit timing recovery) unit (60). Clock signal generator circuit(9) of the clock pulse generator(58) supplies a 32f clock signal (a signal with a frequency 32 times as high as the symbol rate frequency f) to the A/D converter(4), to the data delay unit(55) and to the operation unit(56). The BTR unit(60) of the clock pulse generator(58) supplies a 2f clock signal (a signal with a frequency two times as high as the symbol rate frequency f) to the judging unit(7).

In the above mentioned DQPSK delay detection circuit(51), the semi-synchronous detector(2) synchronously detects an in-phase signal X and quadrature signal Y from the input signal. The detected in-phase signal X and quadrature signal Y are passed through the low-pass filter(3) and inputted to the A/D converter(4). The A/D converter(4) samples this inputted signal at 32f frequency and performs an analog to digital conversion with six quantization bits and then passes this signal to the data delay unit(55) and to the operation unit(56).

Shift register T of the data delay unit(55) delays the output of the A/D converter(4) by a time equivalent to one time slot and passes this one time slot delayed signal to the operation unit(56). The operation unit(56) calculates orthogonal signals I and Q containing code bit information from the present output signal of the A/D converter(4) and the above mentioned one time slot delayed signal of the data delay unit(55). The BTR unit(60) of the clock pulse generator(58) reproduces a 2f clock signal in accordance with the timing of the sign bit of the Q signal from the operation unit(56). Judging unit(7) selects a point with the largest eye aperture among 32 sample points during one time slot on the basis of the 2f clock signal regenerated by the BTR unit(60), and performs parallel-serial conversions before outputting the data.

Figure 7:
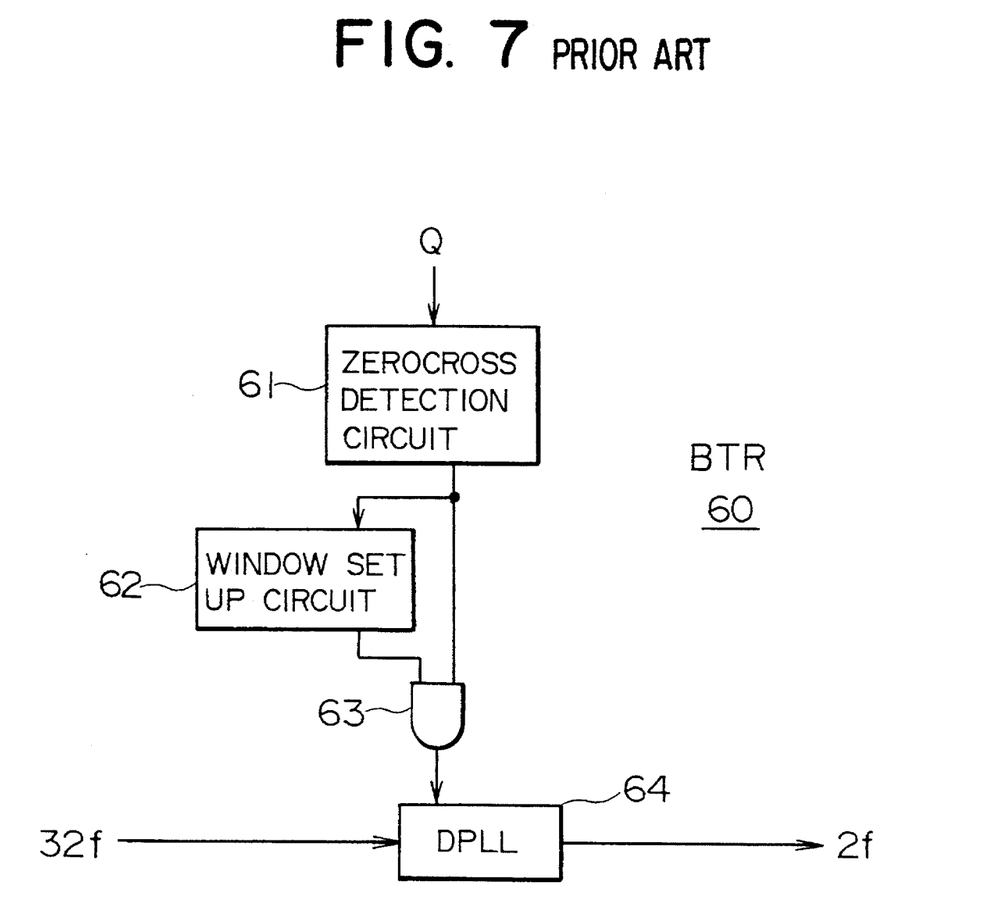
FIG. 7 is a detail block diagram of the BTR unit according to the conventional DQPSK delay detection circuit.

FIG. 7 is an example circuit of the BTR unit(60). Zero-cross detection circuit(61) outputs a signal corresponding to "1" when it detects a zero-cross point of the reversed sign bit of the Q signal. When the zero-cross detection circuit(61) outputs a signal corresponding to "1", the window setup circuit(62) outputs a signal "1" during a predetermined period of time. This predetermined period is a period of time ranging from the time slightly shorter than the symbol rate period 1/f to the time slightly longer than the same.

If both the zero-cross detection circuit(61) and the window setup circuit(62) output a signal "1", then the AND circuit(63) also outputs a signal corresponding to "1". Synchronized with the output signal "1" of the AND circuit(63), DPLL(64) outputs a 2f clock signal. In the above mentioned BTR unit(60), an I signal may be used as an input instead of the Q signal.

In the conventional DQPSK delay detection circuit 51, BTR unit(60) reproduces a 2f clock signal on the basis of the timing when the reversed sign bit of the Q signal is reversed. However when the phase shift in the I/Q coordinates is the same as in the case when the data consists of a repetition of bit chains 0101 . . . , and 0000 . . . , the zero-cross detection circuit(61) cannot properly detect the zero-cross point because there is no change in the sign bit of the Q signal. In such cases there is a disadvantage that the DPLL(64) cannot execute the synchronous drawing and thus failing the reproduction of a 2f clock signal.

Figure 8:
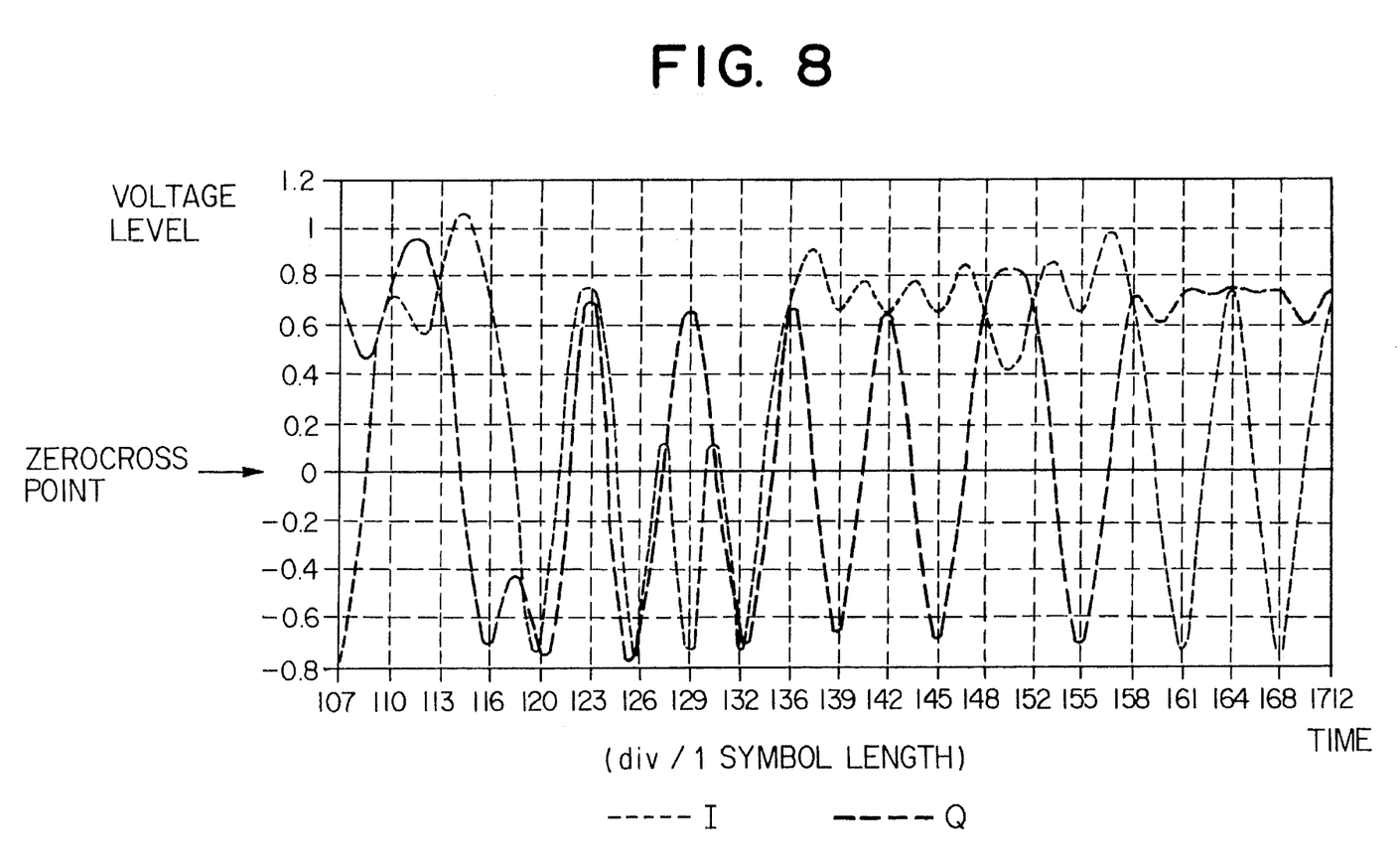
FIG. 8 is a diagram explaining the simulation results of an I signal (short dashed line) and a Q signal (long dashed line).
Figure 9:
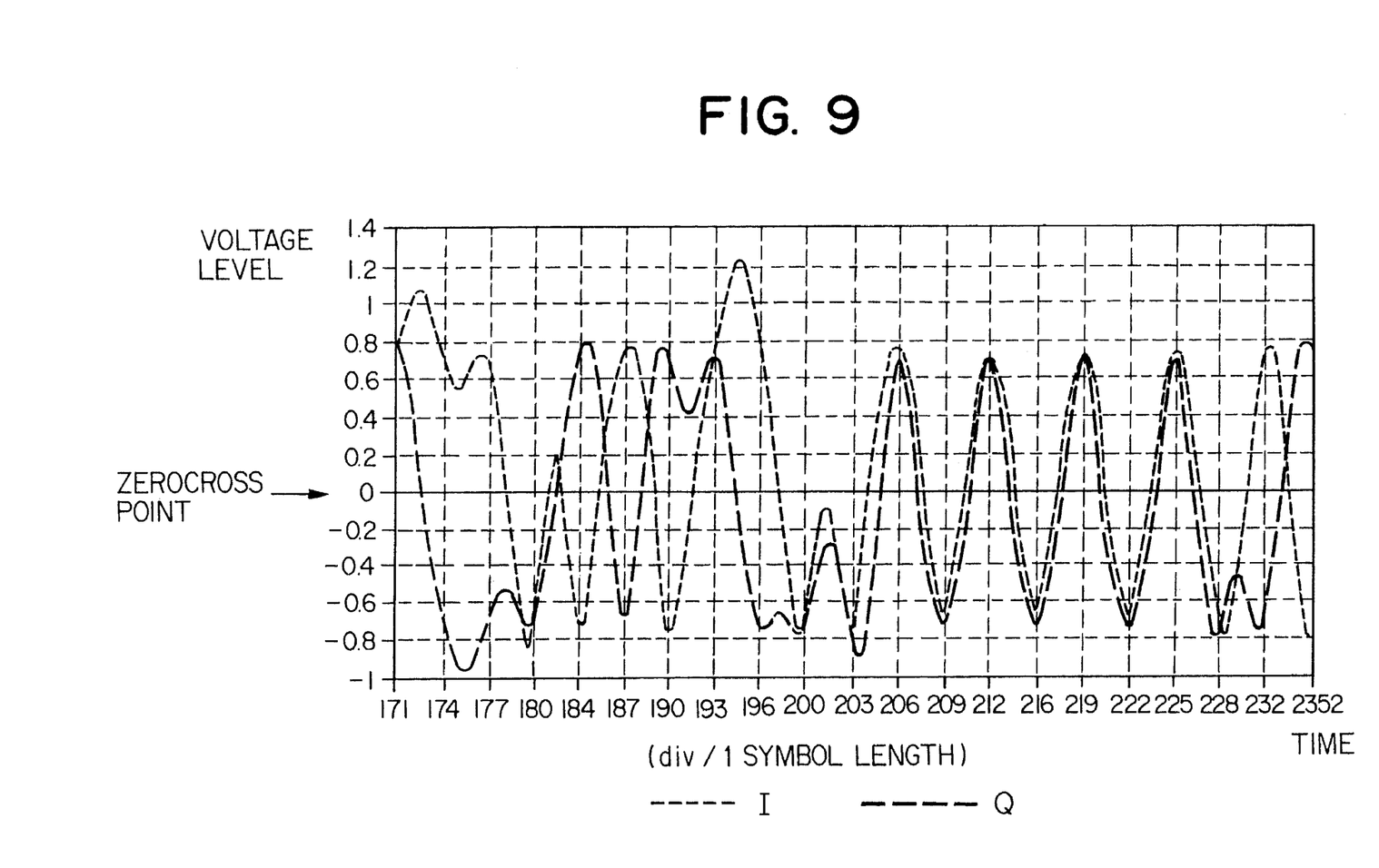
FIG. 9 is a diagram explaining the simulation results of an I signal (short dashed line) and a Q signal (long dashed line).

Q signal (long dashed line) and an I signal (short dashed line) sampled at a frequency 32 times the symbol rate frequency f are shown in FIG. 8 and FIG. 9. It can be seen that the variation in zero-cross points ranges over 40% of the symbol rate period 1/f. Hence there is a disadvantage that a 2f clock signal with large Jitters decreases the reliability of data demodulation.

SUMMARY OF THE INVENTION

In order to overcome the above mentioned problems, an object of the present invention is to provide a DQPSK delay detection circuit that can produce stable regenerative clocks and minimize the jitters of regenerative clocks.

In order to overcome the above mentioned problems, the DQPSK delay detection circuit of the present invention includes, a semi-synchronous detection unit for receiving a DQPSK intermediate frequency signal and for performing a synchronous detection to obtain two demodulation signals including a synchronous detection signal and a quadrature detection signal; a low pass filter unit for extracting a baseband signal from the two demodulation signals; an A/D converter unit for sampling the two demodulation signals based on a sampling signal of a frequency higher than a symbol rate signal to convert into a predetermined number of quantizing bits; a data delay unit for delaying an output from the A/D converter unit by one time slot; an operation unit for producing an I signal and a Q signal from a current output from the A/D converter unit and an output from the A/D converter unit delayed by one time slot by the data delay circuit; a clock producing unit for producing a clock signal based on a zero-cross timing where the difference between the I signal and said Q signal is zero, the clock signal synchronizing with the baseband signal and having a frequency twice the symbol rate frequency; and a judging unit for synchronizing with the baseband signal and operating based on the clock signal, and for outputting a data signal which is demodulated component signal in phase and a quasi-component signal from the I signal and the Q signal and converting into a parallel to serial conversion in order to provide data.

In the DQPSK delay detection circuit of the this invention, both the quasi-synchronous detection circuit unit and the low pass filter unit receive a baseband signal from an input signal and then the A/D converter unit performs an analog/digital conversion. The operation unit calculates the I and Q signals using a current output from the A/D converter unit and a previous output from the A/D converter circuit delayed by one time slot by the delaying unit. Moreover, the judging unit draws data from the I signal and Q signal. The judging unit receives a clock signal having a zero-cross timing based on the difference in the absolute value of the I and Q signals. Such a zero-cross timing which is based on the difference in the absolute values of I signal and Q signal can be detected even in the cases when the data pattern of I signal and Q signal makes it difficult to determine the zero-cross timing. Furthermore, the zero-cross timing based on the difference in the absolute values of I signal and Q signal has less of a variation compared to the zero-cross timing based on the values of I signal and Q signal, resulting in an accurate match with the baseband period. Hence it is possible to securely produce clock signals with less jitter and the reliability of data demodulation can be improved.

DESCRIPTION OF THE PREFERRED EMBODIMENTS

The present invention will be explained below in more detail with reference to the embodiment shown in the attached diagrams. It is apparent that the present invention should not be restricted only by these embodiments.

Figure 1:
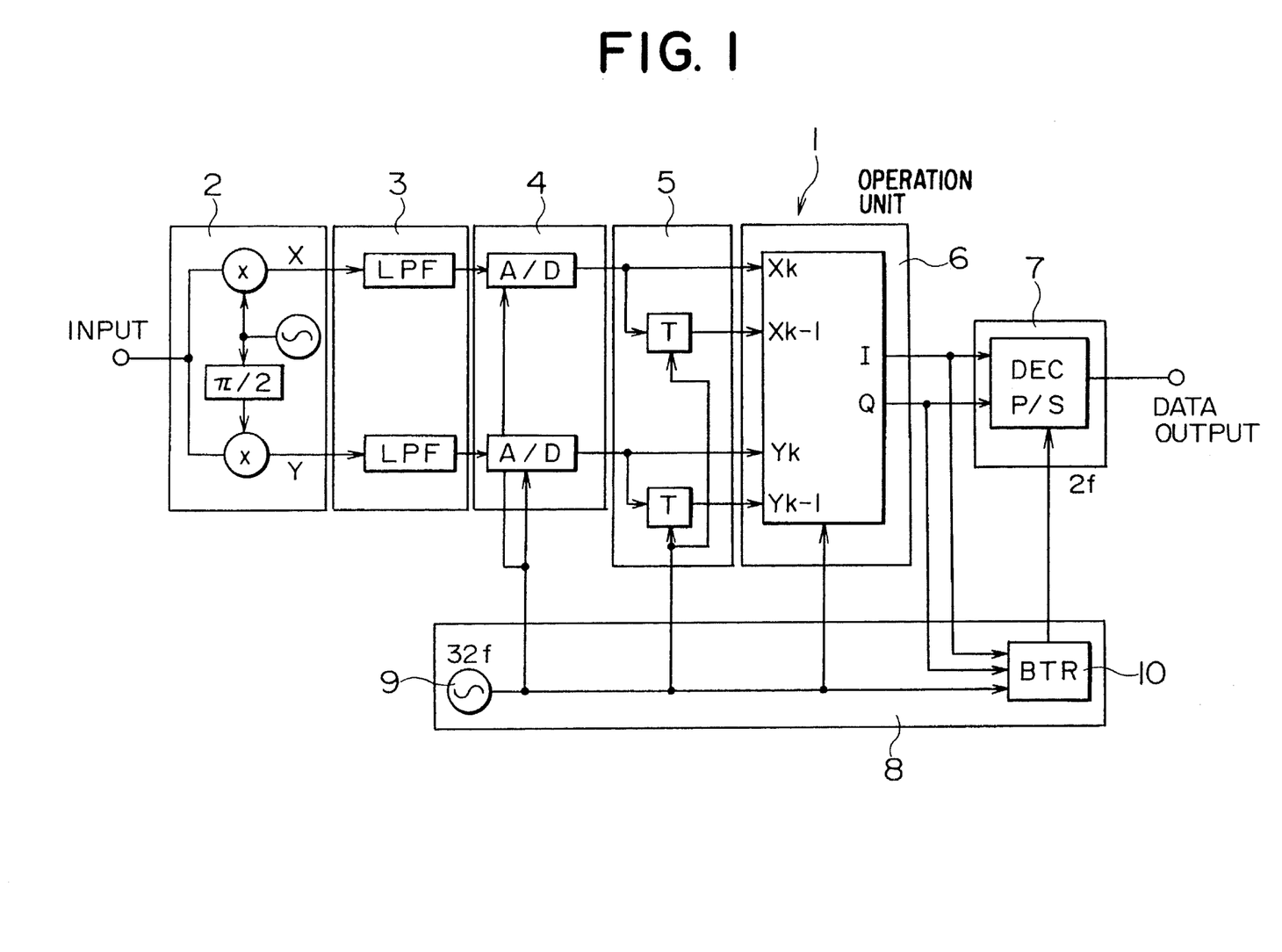
FIG. 1 is a block diagram showing a DQPSK delay detection circuit according to an embodiment of the present invention.

FIG. 1 is a block diagram showing a configuration of a DQPSK delay detection circuit according to an embodiment of the present invention.

The above mentioned DQPSK delay detection circuit, hereafter referred to as DQPSK delay detection circuit(l), is comprised of a semi-synchronous detector(2), a low-pass filter(3), an A/D converter(4), a data delay unit(5), an operation unit(6), a Judging unit(7), and a clock pulse generator(8).

The data delay unit(5) includes a shift register T. The clock pulse generator(8) includes the clock signal generator circuit(9) and a BTR unit(10). Clock signal generator circuit(9) of the clock pulse generator(8) supplies a 32f clock signal (a signal with a frequency 32 times as high as the symbol rate frequency f) to the A/D converter unit(4), to the data delay unit(5) and to the operation unit(6). The BTR unit(10) of the clock pulse Generator(8) supplies a 2f clock signal (a signal with a frequency two times as high as the symbol rate frequency f) to the judging unit(7).

In the above mentioned DQPSK delay detection circuit(l), the semi-synchronous detector(2)synchronously detects an in-phase signal X and quadrature signal Y from the input signal. The detected in-phase signal X and quadrature signal Y are passed through the low-pass filter(3) and inputted to the A/D converter(4). The A/D converter(4) samples this inputted signal at 32f frequency and performs an analog to digital conversion with six quantization bits and then passes this signal to the data delay unit(5) and to the operation unit(6).

Shift register T of the data delay unit(5) delays the output of the A/D converter(4) by a time equivalent to one time slot and passes this one time slot delayed signal to the operation unit(6). The operation unit(6) calculates orthogonal signals I and Q containing code bit information from the present output signal of the A/D converter(4) and the above mentioned one time slot delayed signal of the data delay unit(5). The BTR unit(10) of the clock pulse Generator(8) reproduces a 2f clock signal in accordance with the timing of the sign bit of the Q signal from the operation unit(6). Judging unit(7) selects a point with the largest eye aperture among 32 sample points during one time slot on the basis of the 2f clock signal regenerated by the BTR unit(10), and performs parallel-serial conversions before outputing the data.

Figure 2:
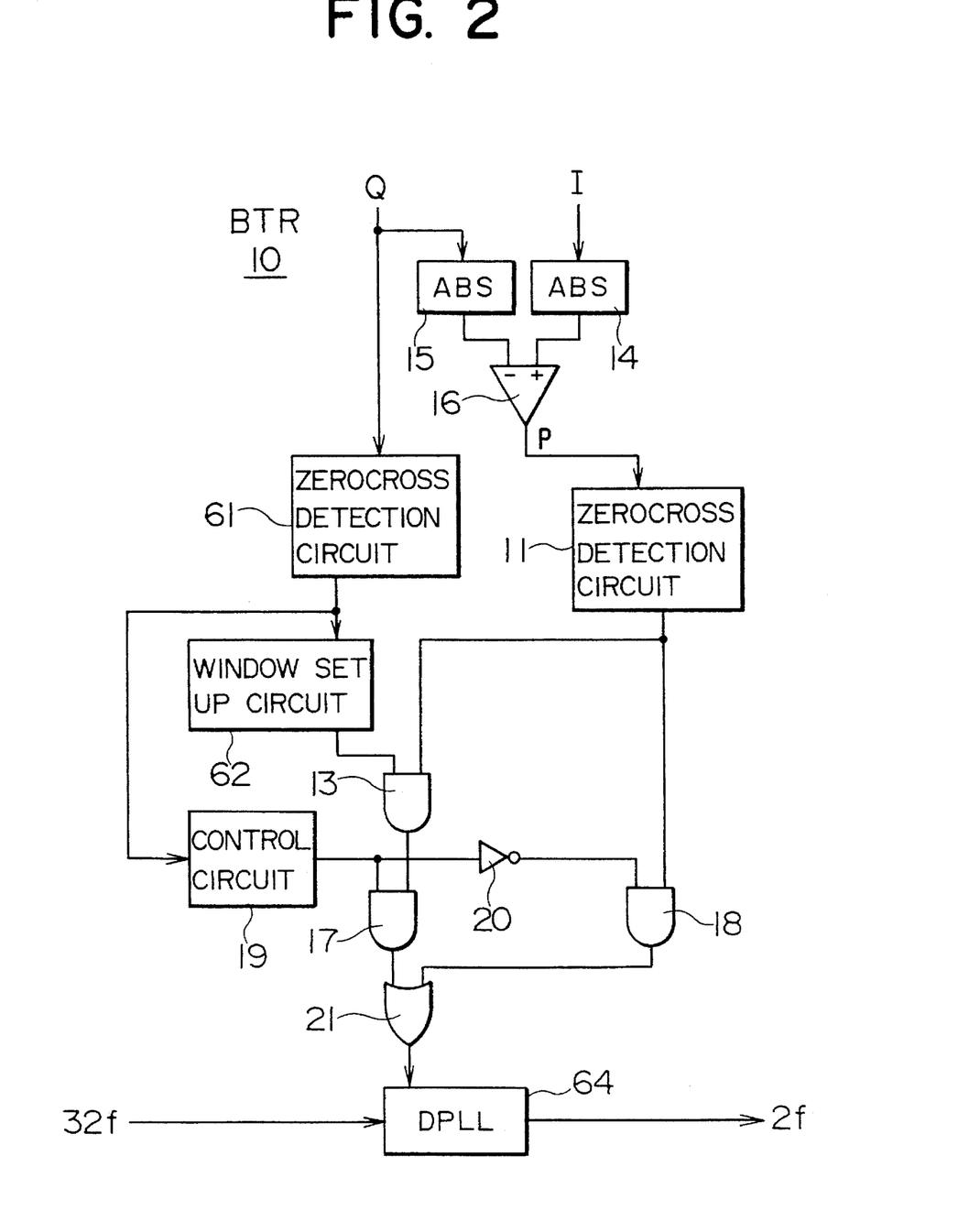
FIG. 2 is a detail block diagram of the BTR unit according to the present invention.

FIG. 2 is an example circuit for the BTR unit(10). Zero-cross detection circuit(61) outputs a signal corresponding to "1" when it detects a zero-cross point of the reversed sign bit of the Q signal. When the zero-cross detection circuit(61) outputs a signal corresponding to "1", the window setup circuit(62) outputs a signal "1" during a predetermined period of time. This predetermined period is a period of time ranging from the time slightly shorter than the symbol rate period 1/f to the time slightly longer than the same.

The absolute value circuit ABS(14) calculates the absolute value of the I signal and the absolute value circuit ABS(15) calculates the absolute value of the Q signal. The subtraction unit(16) subtracts the absolute value of the Q signal from the absolute value of the I signal to produce the difference as a P signal. The zero-cross detection circuit(11) outputs "1" as a zero-cross timing signal when the zero-cross point is detected in response to the reversed sign bit of the P signal. The AND circuit(13) passes the zero-cross timing signal only during the period that the window setup circuit(62) outputs "1". The control circuit(19) supervises the output of the zero-cross detection circuit(61) and outputs "1" when "1" is detected during the predetermined period of time.

The control circuit(19) will output "0" when it is unable to detect a "1" during the predetermined period of time. The output from the control circuit(19) is inputted to the Gate circuit(17) as a Gate control signal while the same output is inverted by the inverter(20) and inputted to the Gate circuit(18) as a Gate control signal.

The gate circuit 17 passes the zero-cross timing signal from the AND circuit 13 only during the period when the control circuit 19 outputs "1". The Gate circuit(17) allows the zero-cross timing signal inputted by the zero-cross detection circuit(11) to pass only when the control circuit 19 outputs "0". The OR circuit(21) inputs to the DPLL(64) either the zero-cross timing signal from the Gate circuit(17)

or the zero-cross timing signal from the Gate circuit(18). The DPLL(64) outputs a 2f clock signal in accordance to the zero-cross timing signal from the OR circuit(21). The operations of the DQPSK delay detection circuit according to the present invention will be explained below.

In the above mentioned DQPSK delay detection circuit(1), the semi-synchronous detector(2) synchronously detects an in-phase signal X and quadrature signal y from the input signal. The detected in-phase signal X and quadrature signal y are passed through the low-pass filter(3) to obtain a baseband signal which in turn is inputted to the A/D converter(4). The A/D converter(4) samples this inputted signal X and Y at 32f frequency and performs an analog to digital conversion with six quantization bits to output digital signal Xk and digital signal Yk respectively and then passes these digital signals to the data delay unit(5) and to the operation unit(6).

The shift register T and T of the data delay unit(5) delays the above mentioned digital signals by one time slot and outputs digital signal Xk−1 and digital signal Yk−1 respectively to the operation unit(6). The operation unit(6) calculates orthogonal signals I and Q containing code bit information from the present digital output signal Xk and Yk of the A/D converter(4) and the above mentioned one time slot delayed digital signal Xk−1 and Yk−1 of the data delay unit(5). The calculated I signal and the Q signal are then inputted to the judging unit(7) and to the BTR unit(10) of the clock pulse generator(8).

In the BTR unit(10), the zero-cross detection circuit(61) detects the zero-cross point of the Q signal in response to the reversed sign bit of the Q signal, and then the window setup circuit(62) sets a window according to the detected zero-cross point. The zero-cross detection circuit(11) detects a zero-cross point of the P signal mentioned above in response to the reversed sign bit of the P signal or the difference between of the absolute values of the I and Q signals to output a zero-cross timing signal.

Figure 3:
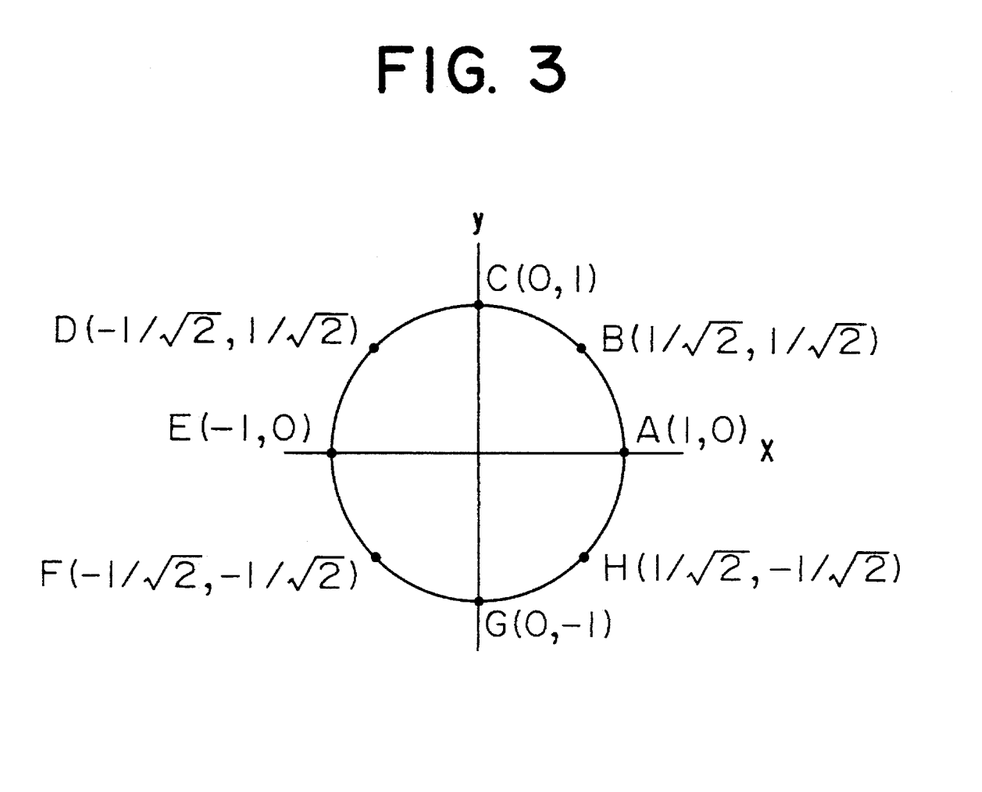
FIG. 3 is a diagram explaining the converging point on constellation of I and Q signals in an ideal case.
Figure 4:
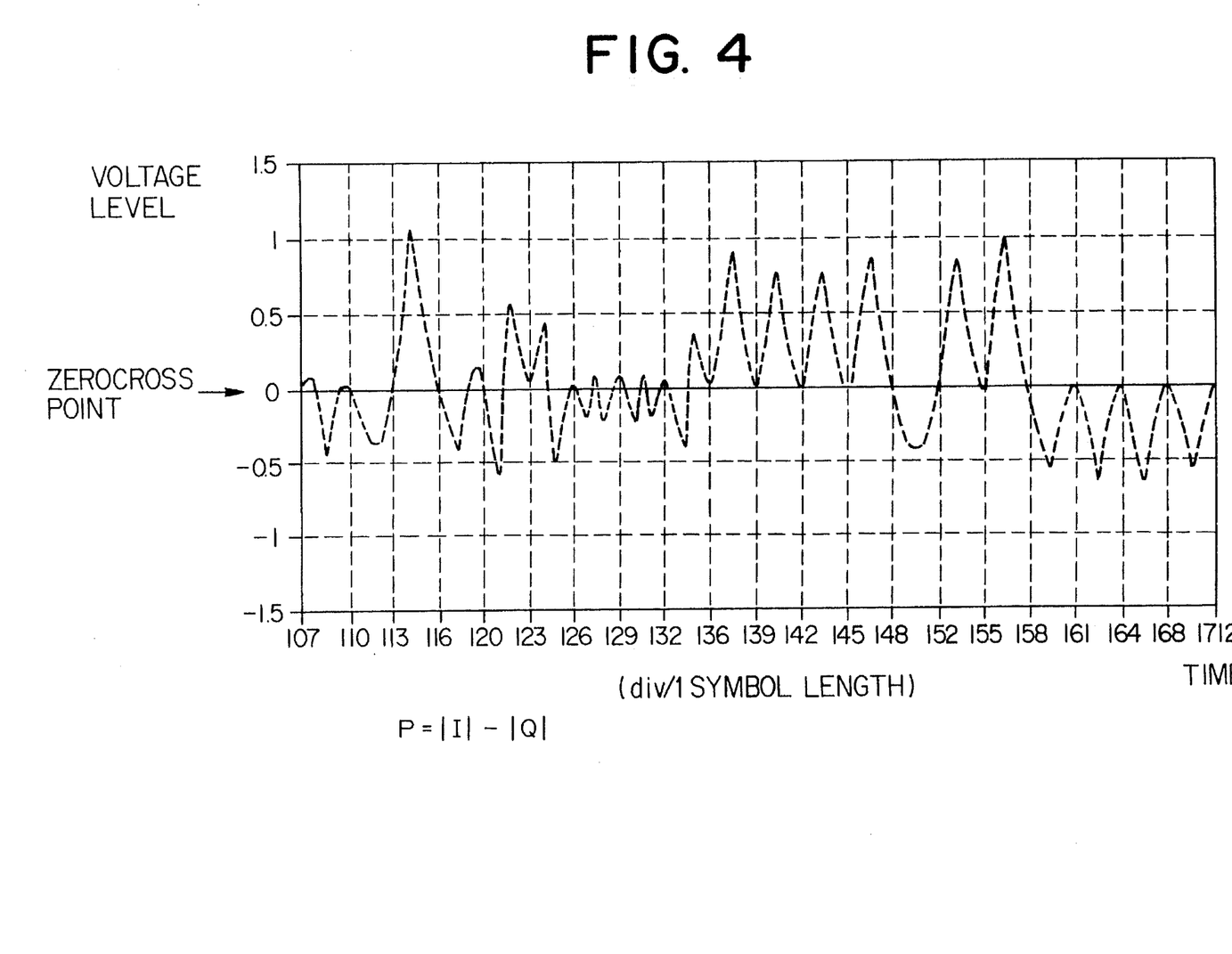
FIG. 4 is a diagram explaining the simulation results of P signal (=|I signal|–|Q signal|).
Figure 5:
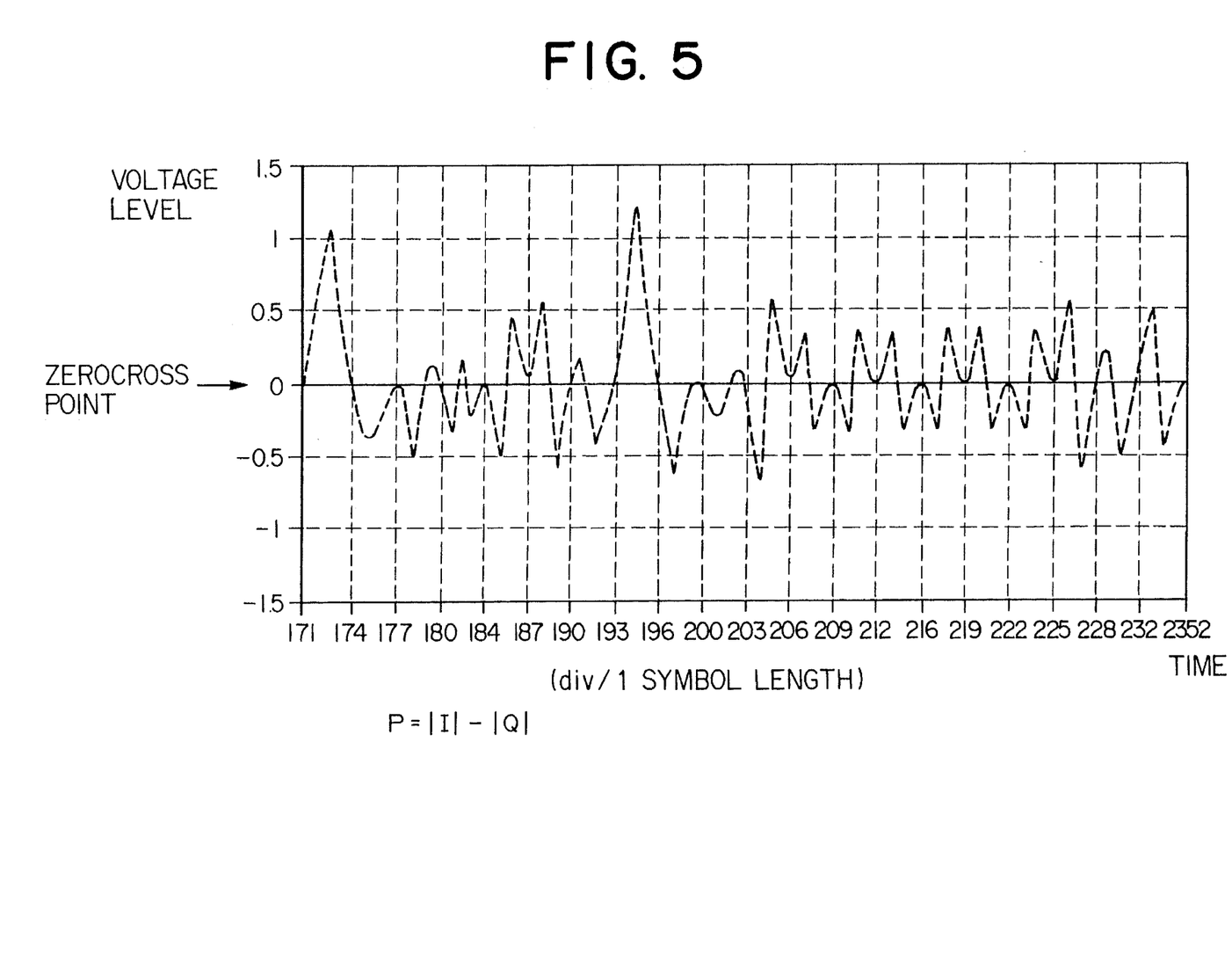
FIG. 5 is a diagram explaining the simulation results of P signal (=|I signal|–|Q signal|).

In an ideal case as shown in FIG. 3, since the I and Q signals necessarily vary between $1/\sqrt{2}$ and $-1/\sqrt{2}$ at the converging points A to H of the constellation, the P signal necessarily becomes zero at every symbol rate period. According to the simulation results shown in FIG. 4 and FIG. 5, the P signal becomes zero at every symbol rate period and at some other times also. At times 136 to 171 in FIG. 4 and at times 206 to 225 in FIG. 5, there are zero-cross timings of the P signal synchronized with the symbol rate period. However, at times 132 to 158 in FIG. 8, there is no zero-cross timing of the I signal and at times 158 to 171 in FIG. 8, there is no zero-cross timing of the Q signal.

If the zero-cross of the P signal is selected in accordance with the window corresponding to the zero-cross point of the Q signal, a timing signal which necessarily becomes zero at every symbol rate period can be certainly obtained. In other words, the above mentioned AND circuit(13) outputs a timing signal that necessarily become zero at every symbol rate period.

When the zero-cross detection circuit(61) detects a zero-cross point of the Q signal, the control circuit(19) outputs "1" so that the timing signal from the AND circuit(13) is allowed to pass through the gate circuit(17). This timing signal is then inputted to the DPLL(64) through the OR circuit(21).

The DPLL(64) produces and outputs a 2f clock signal from a 32f sampling signal. While outputting the 2f clock signal the DPLL(64) controls its timing on the basis of gain or delay in the phase of this 2f clock signal at the time the above mentioned timing signal is inputted. As a result, the 2f clock signal synchronizes with the baseband signal and acts as a clock signal having a frequency twice that of the symbol rate frequency f. This clock signal 2f has less jitters than that used in a prior art.

In such cases when the digital data has the same quantity of phase shift in the I/Q coordinate at all times, that is to say, when the digital data contains repeated bits such as "0101 . . . " and "0000 . . . ", it is meaningless to determine the zero-cross point of the Q signal and the above mentioned timing signal is not allowed to pass through the AND circuit(13) to the gate circuit( 17 ) and since the control circuit( 19 ) produces "0", the zero-cross timing signal from the zero-cross detection circuit(11) is allowed to pass through the gate circuit(18). This timing signal is inputted to the DPLL(64) through the OR circuit(21). Thus, even if the zero-cross point of the Q signal can not be determined due to the reasons stated above it is becomes possible to make the DPLL(64) output a 2f clock signal.

Referring again to FIG. 1, the judging unit(7) outputs a demodulated data signal based on the 2f clock signal, a signal which has a frequency twice that of the symbol rate frequency f, and synchronizes with the baseband signal, and subjects it to a parallel to serial conversion to output the demodulated data.

From the above discussion it can be understood that the DQPSK delay detection circuit of the present invention can certainly reproduce stable clock signals and in turn it is possible to improve the reliability of data demodulation.

What is claimed is:

1. A differential quadrilateral phase shift keying (DQPSK) delay detection circuit comprising:

a semi-synchronous detection means for receiving a DQPSK intermediate frequency signal and for separating in-phase and quadrature phase signals from said DQPSK intermediate frequency signal;

a low pass filter means for extracting a baseband signal from said, in-phase and quadrature phase signals;

an A/D converter for converting said baseband signal into a predetermined number of quantizing bits;

a data delay unit for delaying an output from said A/D converter by one time slot;

an operation unit for generating an I signal and a Q signal from a current output of said A/D converter and an output of said data delay unit;

a clock pulse generator for generating a clock signal on the basis of said I signal and Q signal from said operation unit, said clock signal synchronizing with said baseband signal and having a frequency two times greater than said symbol rate frequency;

said clock pulse generator including:
a clock signal generator for supplying a sampling signal with a frequency higher than that of said clock signal;
a bit timing recovery (BTR) unit for generating said clock signal; and a unit for operating on said I and Q signals and performing parallel to said serial conversions, based on said clock signal;

said BTR unit compressing:
a first absolute value circuit for calculating an absolute value of the I signal;
a second absolute value circuit for calculating an absolute value of the Q signal;
a subtraction unit for generating a difference signal from outputs of said first and second absolute value circuits;

a first zero-cross detection circuit for detecting a zero-cross point of said difference signal and generating a first zero-cross timing signal in response to said difference signal;

a second zero-cross detection circuit for detecting a zero-cross point of said Q signal and generating a second zero-cross timing signal;

means for obtaining a third timing signal which becomes zero at every symbol rate period, from said first zero-cross timing signal and second zero-cross timing signal; and a digital phase locked loop (DPLL) unit for generating a 2f clock signal and adjusting advance and delay in the phase of said 2f clock signal on the basis of said third timing signal.

2. A DQPSK delay detection circuit according to claim 1, wherein said means for obtaining comprises a control circuit which selects either said first zero-cross timing signal or said second zero-cross timing signal as said third timing signal.

3. A DQPSK delay detection circuit according claim 1, wherein said means for obtaining comprises a window setup circuit which opens up a window to pass through said second zero-cross timing signal in accordance with the period of said symbol rate frequency.

4. A DQPSK delay detection circuit according to claim 1, wherein said means for obtaining comprises a gate circuit which outputs a gate timing signal which is synchronized with the period of said symbol rate frequency and obtained from said first zero-cross timing signal and second zero-cross timing signal.

5. A DQPSK delay detection circuit according to claim 1, wherein said means for obtaining comprises:

a window setup circuit which sets a window to pass through said second zero-cross timing signal;

a gate circuit which outputs a timing signal which is synchronized with the period of said symbol rate frequency; and a control circuit which selects either said first zero-cross timing signal or said second zero-cross timing signal as said third timing signal on the basis of said second zero-cross timing signal of said second zero-cross detection circuit.

6. A bit timing recovery unit for use in a differential quadrilateral phase shift keying (DQPSK) delay detection circuit, comprising:

means for receiving orthogonal signals as I and Q signals;

means for calculating an absolute value of said I and Q signals;

means for producing a difference signal from said absolute value of said I and Q signals;

means for generating a first zero-cross timing signal from said difference signal;

means for generating a second zero-cross timing signal from said Q signal which becomes zero at every symbol rate period;

means for obtaining a timing signal from said first and second zero-cross timing signals which synchronizes with said every symbol rate period;

means for generating a 2f clock signal on the basis of said timing signal, said means for generating including means for controlling advance and delay in the phase of said 2f signal on the basis of said timing signal.

7. A bit timing recovery unit according to claim 6, wherein said means for calculating an absolute value comprises an absolute value circuit.

8. A bit timing recovery unit according to claim 6, wherein said means for producing a difference signal comprises a subtraction unit for subtracting said absolute value of said Q signal from that of said I signal.

9. A bit timing recovery unit according to claim 6, wherein said means for generating a first zero-cross timing signal comprises a zero-cross detection circuit for outputting said first zero-cross timing signal when a zero-cross point of said difference signal is detected.

10. A bit timing recovery unit according to claim 6, wherein said means for generating a second zero-cross timing signal comprises a zero-cross detection circuit for detection a zero-cross point of said Q signal.

11. A bit timing recovery unit according to claim 6, wherein said means for obtaining a timing signal comprises a window setup circuit which passes through said second zero-cross timing signal during a predetermined period of time, a control circuit which generates a gate control signal on the basis of said second zero-cross timing, and gate circuit which cooperate with said window setup circuit and to said control circuit to output a gate timing signal in response to said gate control signal.

12. A bit timing recovery unit according to claim 6, wherein said means for controlling advance and delay in the phase of said 2f signal comprises a DPLL unit which adjusts said 2f signal to said zero-cross timing signals.

* * * * *